United States Patent [19]
Knox

[11] Patent Number: 5,970,587
[45] Date of Patent: Oct. 26, 1999

[54] SEAT BELT BUCKLE

[75] Inventor: Matthew J. Knox, Romulus, Mich.

[73] Assignee: Autoliv Development AB, Vargarda, Sweden

[21] Appl. No.: 08/989,171

[22] Filed: Dec. 11, 1997

[51] Int. Cl.[6] .................................................. A44B 11/00
[52] U.S. Cl. ................................ 24/633; 24/637; 24/603
[58] Field of Search ............................ 24/633, 637, 636, 24/645, 602, 603, 664

[56] References Cited

U.S. PATENT DOCUMENTS

| | | | |
|---|---|---|---|
| 4,454,634 | 6/1984 | Haglund et al. | |
| 4,589,172 | 5/1986 | Hoenigs et al. | 24/603 |
| 5,742,986 | 4/1998 | Corrion et al. | 24/633 |
| 5,749,130 | 5/1998 | Bilyeu et al. | 24/637 |
| 5,752,299 | 5/1998 | Vivacqua et al. | 24/633 |
| 5,758,393 | 6/1998 | Wier | 24/633 |

*Primary Examiner*—Victor N. Sakran
*Attorney, Agent, or Firm*—Venable; George H. Spencer; Catherine M. Voorhees

[57] ABSTRACT

A buckle for receiving and locking a tongue connected to a vehicle safety belt, the buckle comprising: a locking element for locking a tongue to the buckle; a sensor to sense locking of the tongue to the buckle; and an indicator arrangement actuable by an output of the sensor to indicate whether the buckle is in a locked or an unlocked condition.

16 Claims, 5 Drawing Sheets

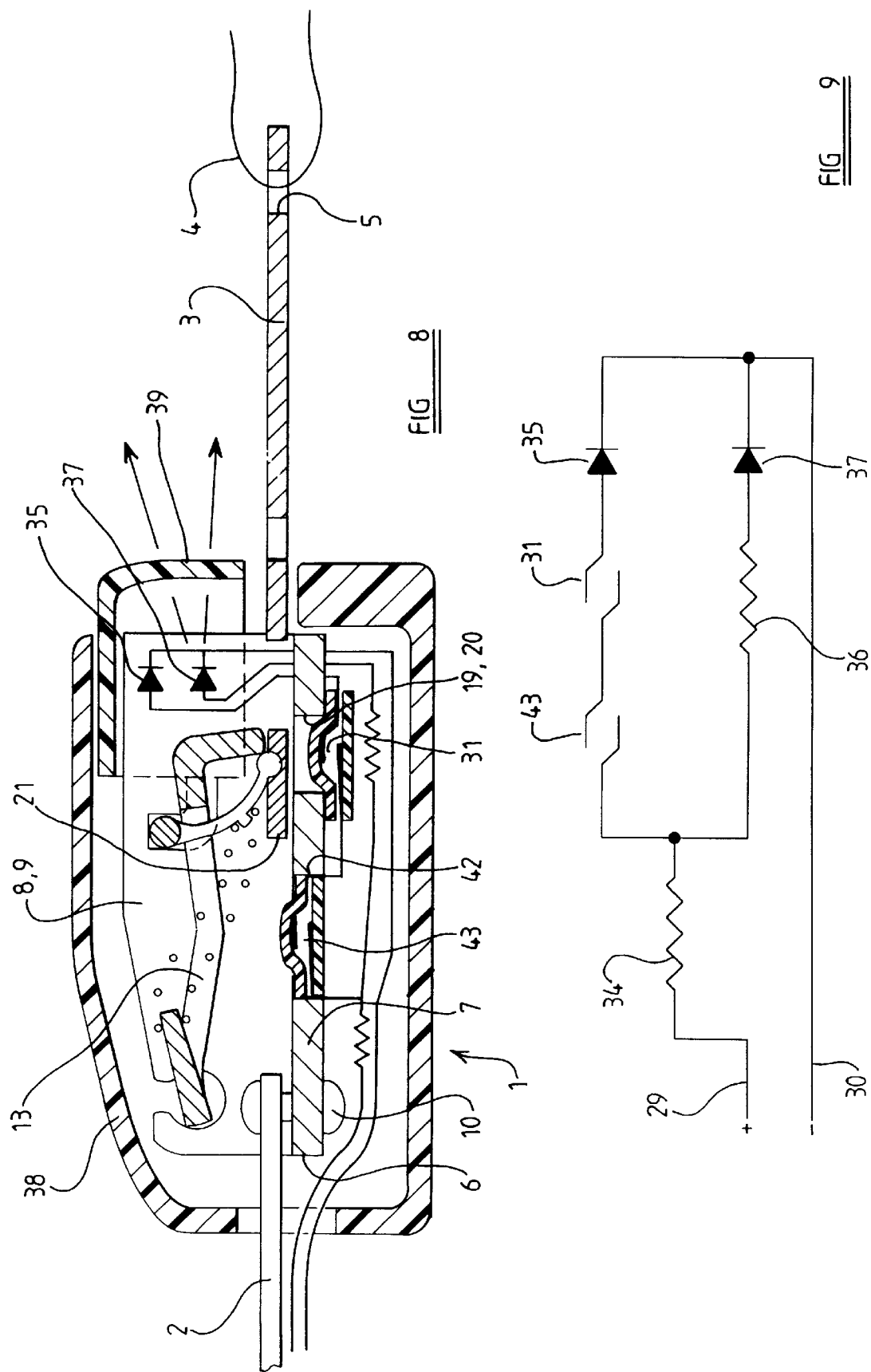

SEAT BELT BUCKLE

FIELD OF THE INVENTION

THIS INVENTION relates to a seat belt buckle for use with a seat belt and more particularly to a seat belt buckle which provides an indication that the seat belt is not being used and which allows relatively easy insertion of a tongue connected to the seat belt into the seat belt buckle.

BACKGROUND OF THE INVENTION

Many vehicles have a warning light or other form of indication on the dashboard of the vehicle to show that a seat belt is not being used. Some vehicles are provided with a switch sensor inside a seat belt buckle which senses the position of a locking element in the buckle to determine whether or not the seat belt is in use. In such a vehicle, when the locking element is in a locking position holding a locking tongue of a seat belt, the warning light or indicator on the dashboard of the vehicle is switched off. When the locking element is disengaged from the locking tongue, the warning light or indicator is switched on.

Another known feature of seat belt buckles is to provide some form of lighting or illumination within or around the buckle to illuminate the buckle itself and specifically a slotted aperture of the buckle into which a seat belt locking tongue is to be inserted to make it easier to find the aperture so that the locking tongue of a seat belt can be readily inserted into and locked by the buckle.

A seat belt buckle incorporating both the switching means for a warning indicator on the dashboard and means to illuminate the buckle requires a large amount of wiring to be associated with the buckle and drawn through into the buckle.

OBJECT OF THE INVENTION

The present invention seeks to provide an improved seat belt buckle.

SUMMARY OF THE INVENTION

Accordingly, one aspect of the present invention provides a buckle for receiving and locking a tongue connected to a vehicle safety belt, the buckle comprising: a locking element for locking a tongue to the buckle; a sensor to sense locking of the tongue to the buckle; and an indicator arrangement actuable by an output of the sensor to indicate whether the buckle is in a locked or an unlocked condition.

BRIEF DESCRIPTION OF THE DRAWINGS

In order that the present invention may be more readily understood, embodiments thereof will now be described, by way of example, with reference to the accompanying drawings, in which:

FIG. 8 is a cross-section through another seat belt buckle and locking tongue embodying the present invention, the buckle being shown in an unlocked condition; and FIG. 9 is a schematic circuit diagram of an electric circuit for use with the embodiment of the present invention shown in FIG. 8, the buckle being in the unlocked condition.

DETAILED DESCRIPTION

Figure 1:
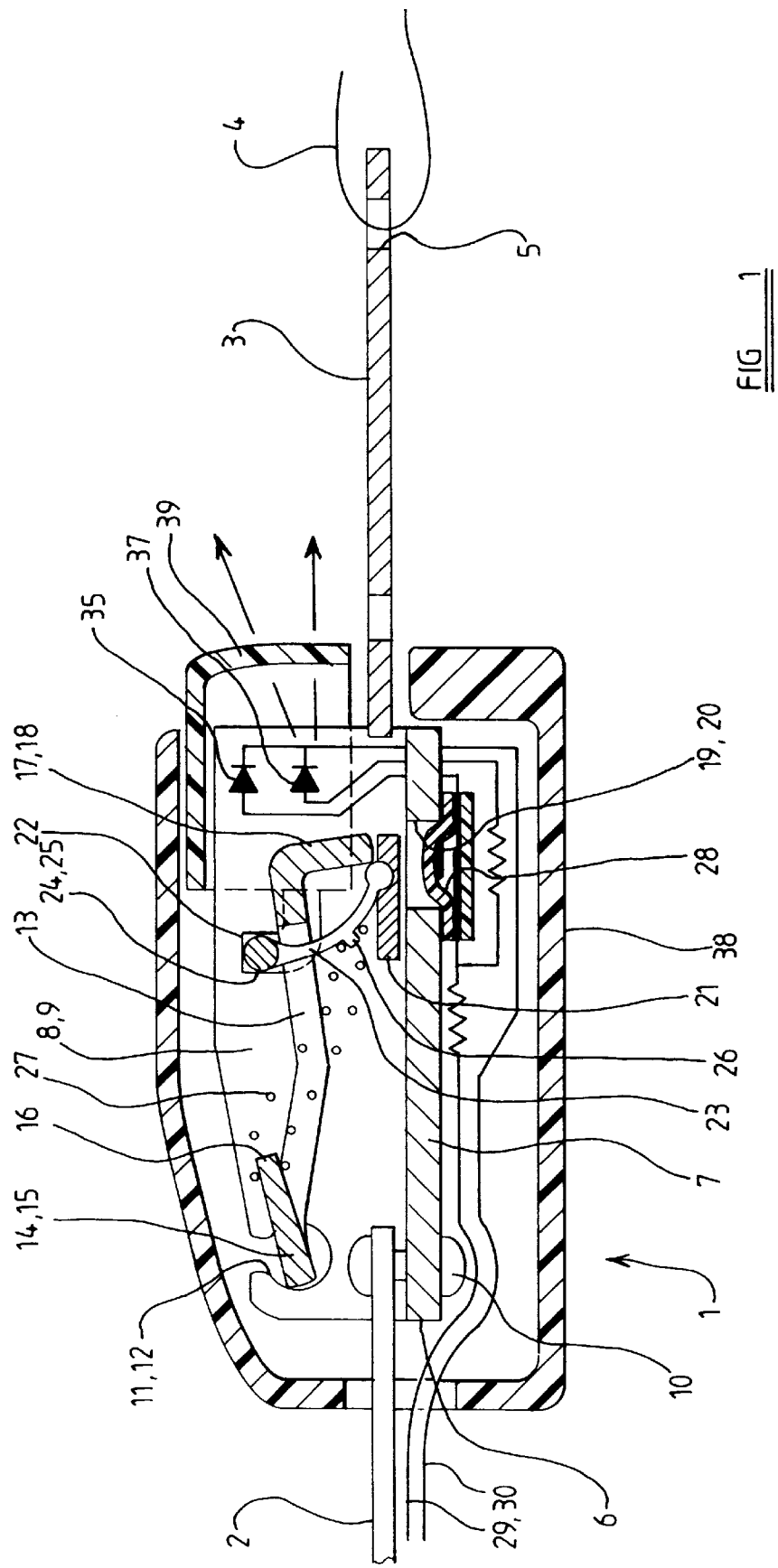
FIG. 1 is a cross-section through a seat belt buckle and locking tongue embodying the present invention, the buckle being shown in an unlocked condition.

Referring to FIG. 1, a seat belt arrangement comprises a buckle 1 mounted on an anchorage bar 2 and a locking tongue 3 for engagement in the buckle 1, a seat belt strap 4 being threaded through an aperture 5 provided at one end of the locking tongue 3. Such a seat belt arrangement is known, for example, from U.S. Pat. No. 4,454,634, the disclosure of which is hereby incorporated.

The buckle 1 comprises a housing 6 made of metal having a channel-shaped cross section consisting of a bottom wall 7 and two upstanding side walls 8, 9. The bottom wall 7 is attached at one end to an end of the anchorage bar 2 by a pin or rivet 10.

A pair of cupped apertures 11, 12 are provided in the side walls 8, 9 such that a locking member 13 can be hingedly mounted in the cupped apertures 11, 12 by way of a pair of lugs 14, 15 located at one end of the locking member 13.

The locking member 13 comprises an elongate element having at its hinged end a raised tab 16 and, at the opposite end, a downwardly depending pair of claws 17, 18. The locking member 13 is hingeable between a releasing position shown in FIG. 1 in which the claws 17, 18 are located above the bottom wall 7 and a locking position shown in FIG. 2 in which the claws 17, 18 pass through appropriately formed slots 19, 20 in the bottom wall 7.

A slidable ejector plate 21 is located on the bottom wall 7 adjacent the slots 19, 20. The ejector plate 21 is connected to a holding bar 22 located above the locking members 13 by a flexible link 23. The holding bar is held in the housing 6 by means of L-shaped guide slots 24, 25 located in the side walls 8, 9. The link 23 is pivotally connected to both the slidable ejector plate 21 and the holding bar 22. The link 23 is provided with a boss 26 at about its mid point between the ejector plate 21 and the holding bar 22 such that a compression spring 27 is held at one end by the boss 26 and at the other end by the raised tab 16 of the locking member 13.

The compression spring 27 attached to the locking member 13 by the raised tab 16 biases the locking member 13 into the releasing position shown in FIG. 1.

On the other side of the bottom wall 7 to the locking member 13, a sensor 28 is located in or adjacent to one of the slots 19, 20. In the example shown in FIG. 1, the sensor 28 partially protrudes into the slot 19.

Figure 2:
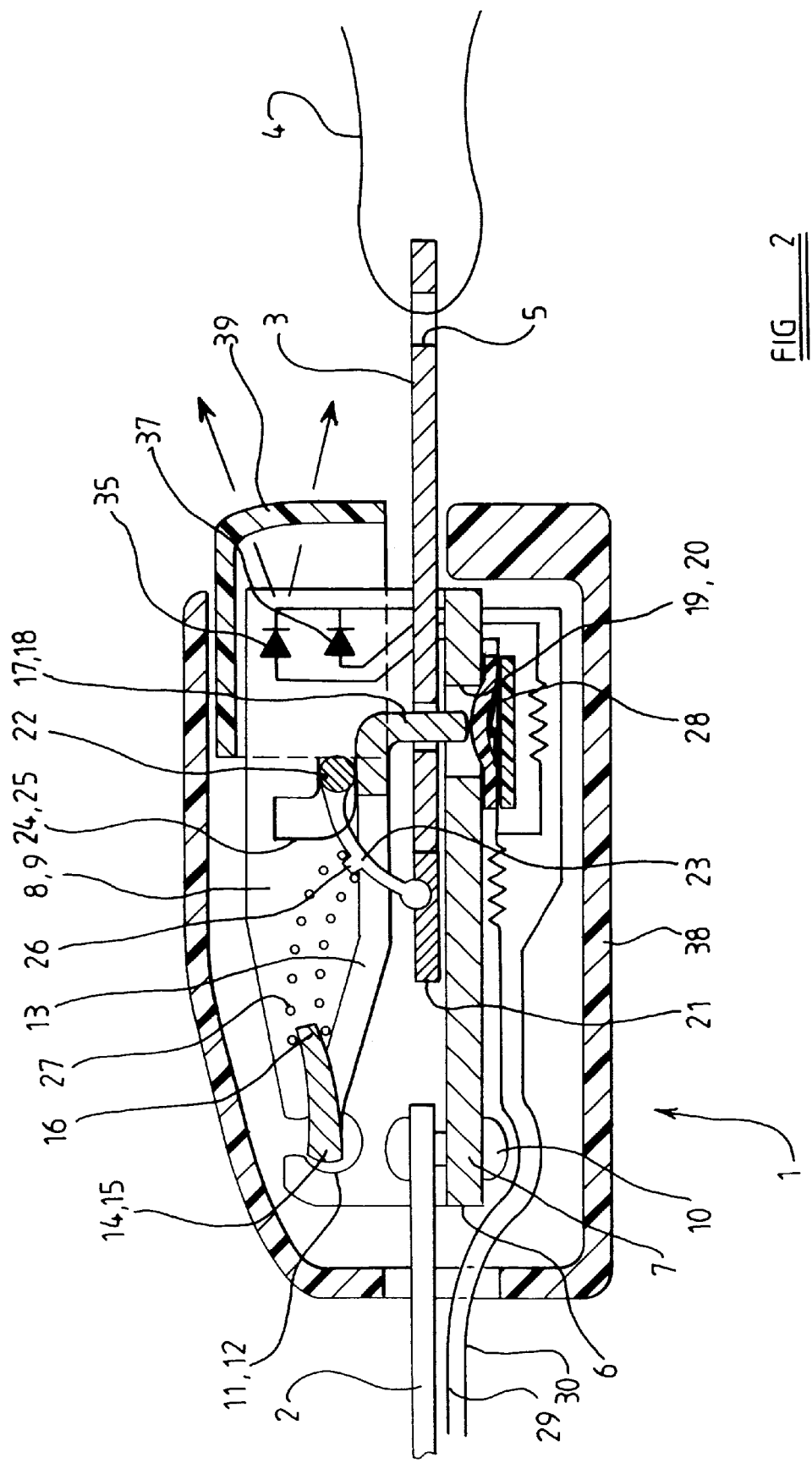
FIG. 2 is a cross-section of the buckle of FIG. 1, the buckle being shown in a locked condition.

When the locking member 13 is in the locking position as shown in FIG. 2, the claws 17, 18 make contact with or activate the sensor 28.

Figure 3:
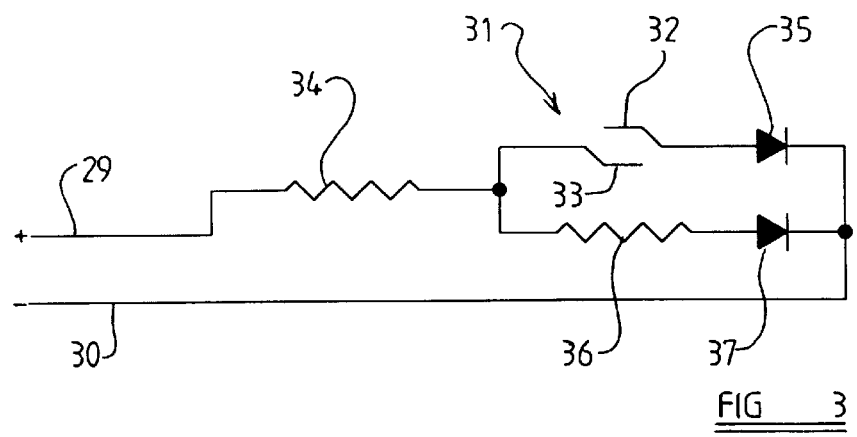
FIG. 3 is a schematic circuit diagram of an electric circuit for use with the buckle of FIG. 1, the buckle being in the unlocked condition.
Figure 4:
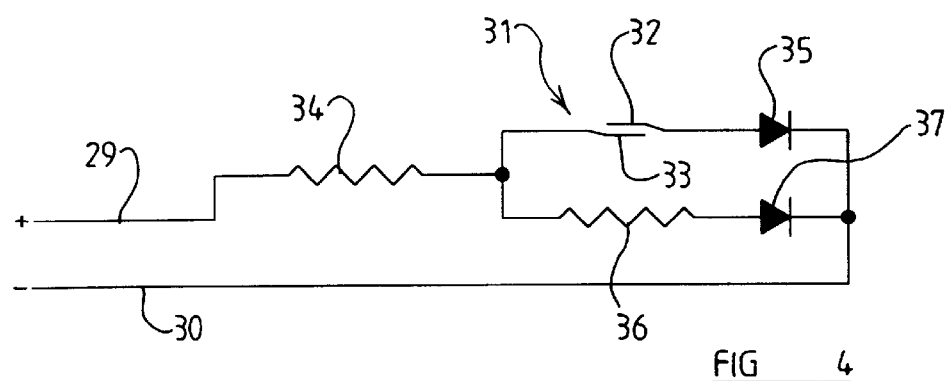
FIG. 4 is a schematic circuit diagram of an electric circuit for use with the buckle of FIG. 1 in the locked condition.

A pair of electrical wires 29, 30 run into the buckle 1 from respective terminals of a power supply, such as a vehicle battery, there being a potential difference of, for example, 12 Volts between the terminals, the power supply being a 12 Volt DC power supply. The wires 29, 30 are connected to a circuit arrangement located adjacent to the bottom wall 7 of the housing 6. The circuit arrangement is shown schematically in FIGS. 3 and 4. FIG. 3 shows the circuit in which the sensor 28 is a switch 31 comprising switch elements 32,33 in an open condition and FIG. 4 shows the switch 31 in a closed condition. In the circuit shown in FIGS. 3 and 4, a resistor 34 is connected to the positive terminal of the power supply by wire 29. The circuit then divides into two branches, the first branch comprising the switch 31 connected in series with a first light emitting diode (LED) 35 which is preferably green and a second branch in which a second resistor 36 is connected in series with a second light emitting diode (LED) 37 which is preferably red. The two parallel branches are then connected back to the negative terminal of the power supply by wire 30. In one example, resistor 34 has a value of 2 kΩ, resistor 36 has a value of 1 kΩ and the resistive loads of the light emitting diodes 35, 37 are 1 kΩ each.

The buckle is provided with a plastic cover 38 which encloses the housing 6. The cover 38 has an entrance for receiving the locking tongue 3. A release button 39 is slidably received in the plastic cover 38. The release button 39 is substantially transparent and is located adjacent the entrance to the plastic cover 38. The LEDs 35,37 of the circuit arrangement are located under the release button 39 and adjacent to the entrance of the cover 38. The release button 39 is spring biased by a compression spring (not shown) located between the release button 39 and the claws 17, 18 of the locking member 13. As shown in FIG. 2, when the locking member 13 is in the locking position, the holding bar 22 is engaged by contact surfaces of the release button 39.

To lock the locking tongue 3 in the buckle 1, starting from the releasing position shown in FIG. 1, the locking tongue 3 is presented to the buckle 1 at the entrance of the plastic cover 38. The locking tongue 3 is inserted in the entrance until it abuts the slidable ejector plate 21. The locking tongue 3 then forces back the ejector plate 21 causing the link 23 to flex and to compress the compression spring 27 between the link 23 and the raised tab 16. As the ejector plate 21 is pushed from right to left, as shown in FIGS. 1 and 2, the bottom of the link held in the ejector plate 21 passes below the holding bar 22. Once the ejector plate 21 travels further to the left after passing under the holding bar 22, the flexible link 23 straightens to exert a rightward force on the holding bar, the shape of the periphery of the L-shaped slot 24,25 serving to push the holding bar rightwards and downwards along the L-shaped slot 24,25 thereby forcing the locking member 13 downwardly into its locking position. As the link 23 pushes the holding bar 22 in an over-dead-centre action onto the locking member 13, a necked portion of the locking tongue 3 is located below the claws 17, 18 such that the claws 17, 18 pass either side of the necked portion of the locking tongue 3 and into the slots 19, 20 in the bottom wall 7 so as to lock the locking tongue 3 in place within the buckle 1. The holding bar 22 rests above the locking member 13 in the L-shaped guide slots 24,25 such that the locking member 13 is held in place and cannot return to the releasing position.

In order to release the locking tongue 3 from the buckle 1, the release button 39 is pressed inwardly of the plastic cover 38 such that the contact surfaces of the release button 39 abut the holding bar 22, as shown in FIG. 2, thereby forcing the holding bar 22 along the length of the L-shaped guide slot up and away from its position above the locking member 13. As the holding bar 22 moves along the slot, the link 23 again performs an over-dead-centre action as the compression spring 27 pushes the slidable ejector plate 21 along the bottom wall 7 toward the entrance to the cover 38 whilst the locking member 13 is biased upwardly by the compression spring 27 acting against the raised tab 16 of the locking member 13. In this manner, the locking member 13 is moved into the releasing position and the locking tongue is ejected from the buckle 1.

In operation, when the switch 31 is open as shown in FIG. 3, only the red LED 37 will be lit. In contrast, when switch 31 is closed, the majority of the current will pass through the green LED 35 which will be lit, the red LED 37 not being lit. Therefore, when the locking tongue 3 is inserted and locked in the buckle 1, only the green LED 35 will be lit and when the buckle is in the open condition, with no locking tongue 3 inserted therein, only the red LED 37 will be lit.

Since the LEDs 35,37 are located in the cover 38 under the release button 39 and the release button 39 is substantially transparent, the light from the LEDs 35,37 can be clearly seen. Indeed, the light from the red LED 35 serves to illuminate the entrance to the cover 38 so that the locking tongue 3 can be easily inserted in the entrance whilst also providing a warning indication that the seat belt is not secure. Once the locking tongue 3 has been inserted in the buckle 1 and the locking member 13 is locked onto the locking tongue 3 thereby closing the switch 31 and securing the seat belt, the red LED 35 is turned off and the green LED 21 is turned on. The green LED 37 serves as a form of back light to illuminate the release button 39 so that it can be easily found and also provides an indication that the buckle 1 is fastened.

The sensor 28 is described above as a switch 31. However, the sensor is preferably a Hall effect element which senses the presence of the claws 17,18 in the slots 19,20 of the bottom wall 7. The Hall effect element is more reliable than an electromechanical switch 31.

Whilst it is preferred that the light emitting devices are light emitting diodes, they could equally be filament bulbs or the like. Additionally, the LED 37 could be substituted for a sound generating means such as a buzzer located in the buckle 1 to provide a warning indication when the seat belt is not secured.

Other colour combinations other than red or green for the light emitting diodes 35,37 are envisaged.

Whilst the release button 39 has been described as transparent, the cover 38 may also be transparent or partially transparent or have transparent or partially transparent portions through which light from the LEDs 35,37 is visible and, indeed, serves to illuminate the buckle.

Preferably, the wire 29 is connected directly to the positive terminal of the power supply whereas the wire 30 is connected to earth by a convenient point on the chassis of the vehicle. It is also possible to connect wires 29,30 to the power supply unit by way of a vehicle computer or central processing unit so that the correct functioning of the buckle circuitry can be verified.

Figure 5:
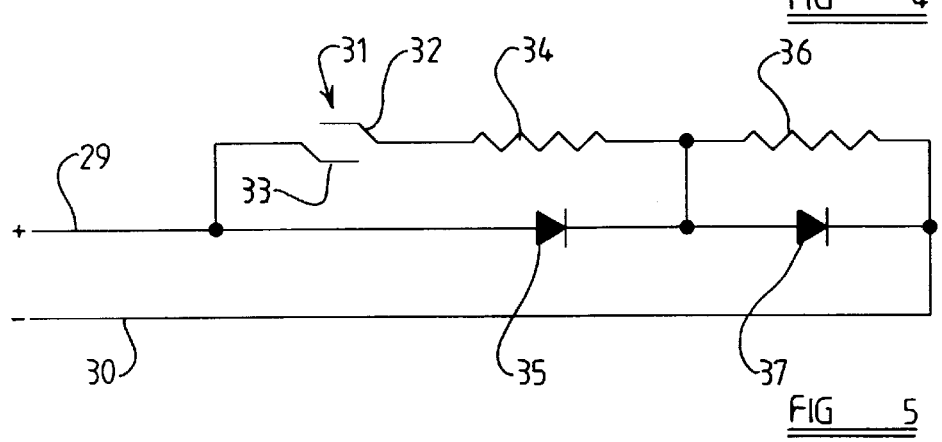
FIG. 5 is a further schematic circuit diagram of an electric circuit for use with another embodiment of the present invention, the buckle being in the unlocked condition.
Figure 6:
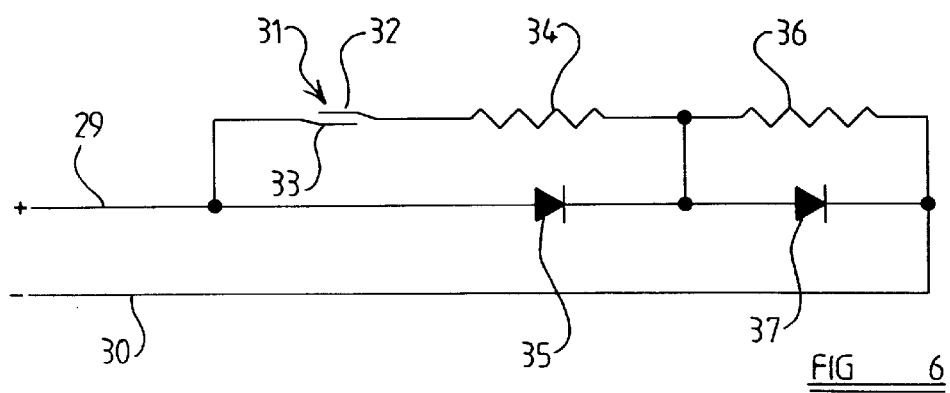
FIG. 6 is a schematic circuit diagram of the circuit of FIG. 5, the buckle being in the locked condition.

FIGS. 5 and 6 show an alternative circuit arrangement to that shown in FIGS. 3 and 4 but which has the same effect. Referring to FIGS. 5 and 6, the wire 29 connected to the positive power supply terminal branches into two parallel branches, a first branch comprising, in series, the switch 31, a first resistor 34 and a second resistor 36. The second branch comprises, in series, a first LED 35 and a second LED 37. The common junctions of the first resistor 34 and the second resistor 36 are connected to the common junctions of the first LED 35 and the second LED 37. Thus, when the switch 31 is open as shown in FIG. 5, only the first LED 35 is illuminated, there being insufficient current to illuminate the second LED 37 and, when the switch 31 is closed as shown in FIG. 6, only the second LED 37 is illuminated, there being insufficient current to illuminate the first LED 35.

Exemplary values for the two resistors 34,36 in the FIGS. 5 and 6 are 0.7 kΩ and 2 kΩ respectively, the resistive loads of the LEDs 35,37 both being 2 kΩ, the power supply being a 12 Volt DC supply.

Figure 7:
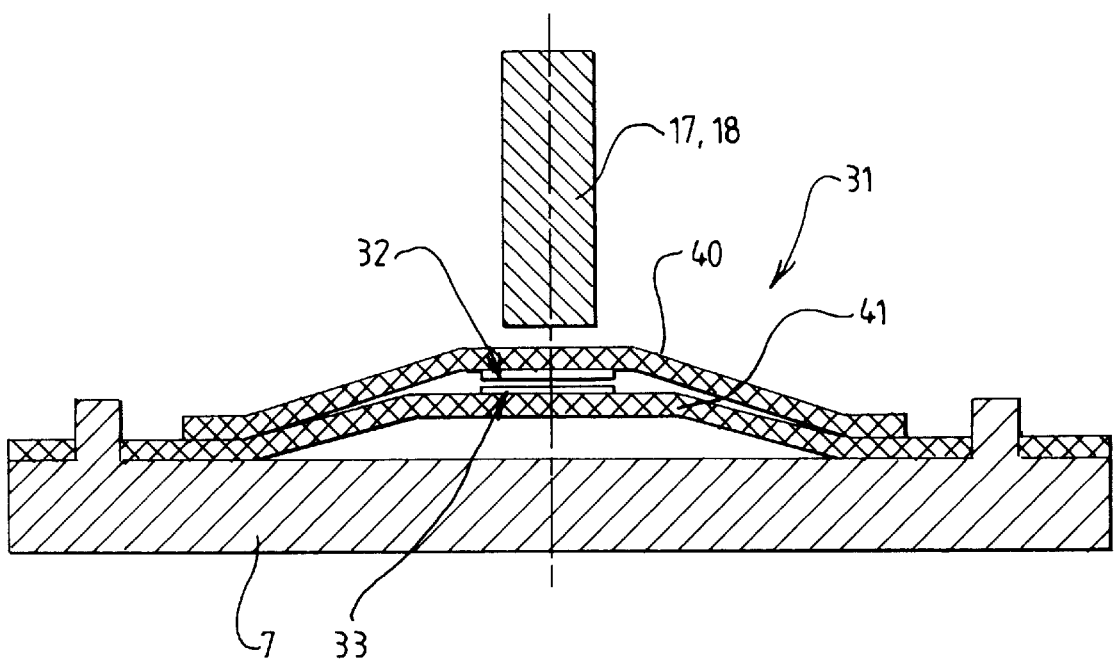
FIG. 7 is a cross-sectional detail of a locking element and switch for use with an embodiment of the present invention.

Referring to FIG. 7, this shows a preferred form of switch 31 comprising two bowed flexible membranes 40,41 each attached at respective ends to the bottom wall 7. The flexible membranes 40,41 are provided with, on opposed facing surfaces, electrical contacts comprising the switch elements 32,33. The switch elements 32,33 are spaced apart so that the switch 31 is open. However, the switch elements 32,33 make electrical contact with one another when the membranes 24,25 are deformed upon contact by a claw 17,18 so as to close the switch 31.

A further embodiment of the buckle is shown in FIG. 8. This embodiment is a variation on the arrangement shown in FIG. 1. In addition to the slots 19,20 formed in the bottom wall 7, a further aperture 42 is provided between the slots 19,20 and the pin 10 at the end of the path that the ejector plate 21 takes when moving from the releasing position to the locking position. An ejector switch 43 of the same structure as switch 31 is located in the further aperture 42 so as to project into the path of the ejector plate 21. The ejector switch 43 is closed when the ejector plate 21 is in the locking position and open when the ejector plate 21 is in the releasing position. The circuit arrangement for this embodiment is shown in FIG. 9 and is based on the circuit arrangement of FIGS. 3 and 4. The ejector switch is added to the arrangement of FIGS. 3 and 4 in series with the switch 31. Thus, the green LED 37 is only illuminated when both switches 31,43 are closed. This provides a very safe indication that the locking tongue 3 is secured in the buckle since both the locking member 13 and the ejector plate 21 must be in their respective locking positions for the switches 31,43 to be closed to illuminate the green LED 37.

What is claimed is:

1. A buckle for receiving and locking a tongue connected to a vehicle safety belt, the buckle comprising:

a housing with an entrance for receiving the tongue to be locked;

at least one light-emitting device located in the housing to illuminate said entrance;

a locking element for locking the tongue to the buckle;

a sensor to sense locking of the tongue to the buckle, said locking element and said sensor being positioned in the housing; and an indicator arrangement being actuated by an output of the sensor to indicate whether the buckle is in a locked or an unlocked condition.

2. A buckle according to claim 1, wherein the indicator arrangement, which is capable of being actuated by an output of the sensor to indicate whether the buckle is in a locked or unlocked condition, comprises said at least one light-emitting device, and one of said at least one light-emitting device being illuminated when the tongue is locked to the buckle.

3. A buckle according to claim 2, wherein the indicator arrangement comprises two light-emitting elements of different color, one light-emitting device for illuminating the entrance and the other light-emitting device being illuminated when the tongue is locked to the buckle.

4. A buckle according to claim 3, wherein one color is green and another color is red.

5. A buckle according to claim 1, wherein the sensor is a switch, one output of the switch being when the switch is open and the other output of the switch being when the switch is closed.

6. A buckle according to claim 5, wherein the switch is an electromechanical switch.

7. A buckle according to claim 1, wherein the sensor is a Hall effect element.

8. A buckle according to claim 1, wherein the sensor is actuated by the locking element.

9. A buckle according to claim 8, wherein a tongue is provided having a slot to which the locking element is engaged to lock the tongue to the buckle, the sensor being actuated by the locking element engaging with the slot.

10. A buckle according to claim 1, wherein an ejector is provided to eject the tongue from the buckle after release of the tongue, the sensor comprising two sensor elements, one sensor element being actuated by the locking element and the other sensor element being actuated by the ejector.

11. A buckle according to claim 10, wherein the two sensor elements are switched connected in series.

12. A buckle according to claim 1, wherein the buckle is at least partially transparent.

13. A buckle according to claim 1, wherein the buckle is provided with at least one portion which is at least partially transparent.

14. A buckle according to claim 1, wherein the buckle is provided with a release button to release the tongue from the buckle, the release button being at least partially transparent.

15. A buckle according to claim 1 in combination with a tongue fitted to a seat belt strap.

16. A buckle for receiving and locking a tongue, the buckle comprising a housing with at least one position which is at least partially transparent, the housing containing:

a locking element for locking a tongue to the buckle;

a sensor to sense locking of the tongue to the buckle;

two light emitting devices, a first light emitting device actuable by an output of the sensor to indicate that the buckle is in a locked condition and a second light emitting device being actuable by an output of the sensor to indicate that the buckle is in an unlocked condition; and wherein the buckle has an entrance into which the tongue is to be inserted to be locked to the buckle, the second light emitting device, upon actuation, illuminating the entrance.

* * * * *